June 8, 1926.
L. ROUANET
WHEEL FOR MOTOR VEHICLES
Filed April 11, 1922
1,587,923
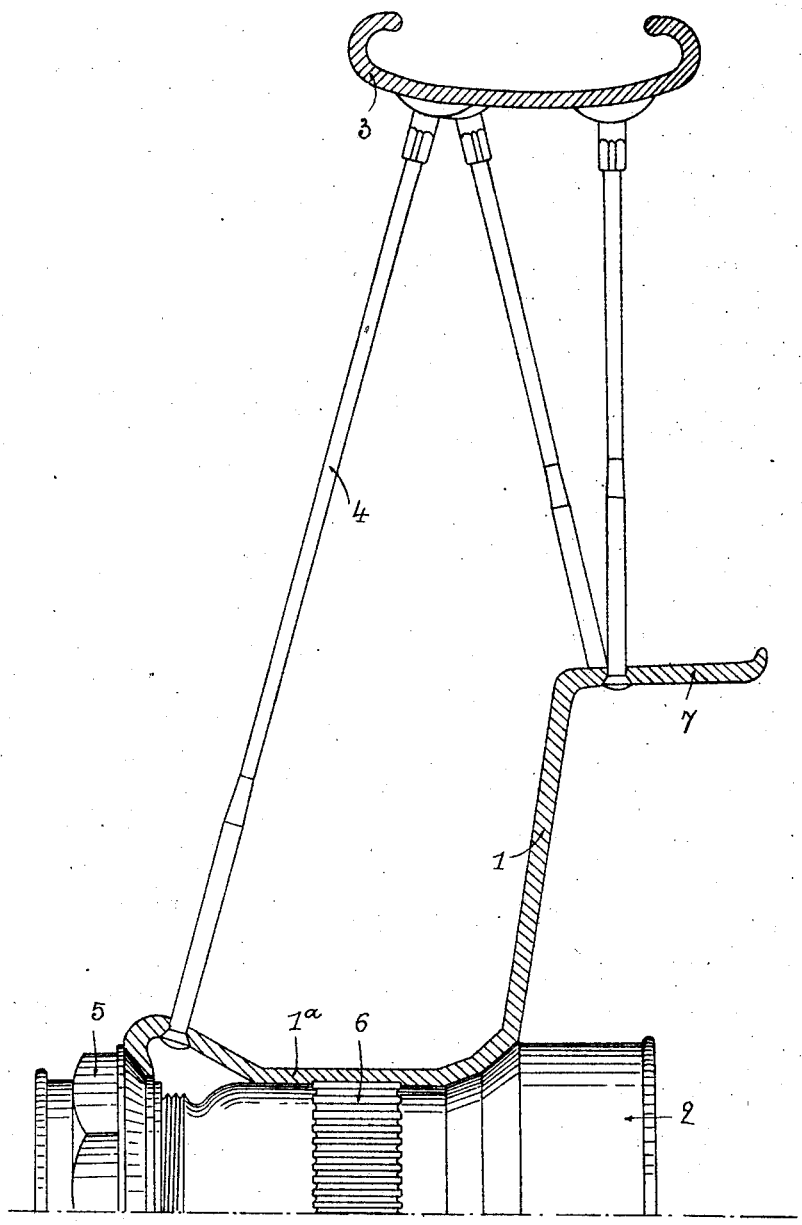
INVENTOR:
Louis Rouanet
BY: Francis E. Boyce
ATTORNEY.

Patented June 8, 1926.

1,587,923

UNITED STATES PATENT OFFICE.

LOUIS ROUANET, OF IVRY-PORT, FRANCE, ASSIGNOR TO COMPAGNIE D'APPLICATIONE MECANIQUES, OF PARIS, FRANCE.

WHEEL FOR MOTOR VEHICLES.

Application filed April 11, 1922, Serial No. 551,679, and in France May 7, 1921.

The invention relates to removable wheels of the type in which an external (removable) hub is mounted as a sleeve upon an internal (permanent) hub, the two hubs being adapted to rotate as a whole.

In this type of wheel the external hub is secured to the internal hub by means of a central nut.

The invention consists in the fact that the sleeve forming the external removable hub is pressed in a single piece with the brake drum, which reduces the cost of the wheels which are to be braked and affords a more ready access to the braking elements secured to the vehicle frame, all of which is very important, especially since the tendency towards a more general use of brakes for front as well as for rear wheels.

The invention does not relate to the devices for securing the removable hub to the wheel spokes, which may be of any kind.

According to one of the preferred forms of the invention, the outer removable hub with its brake drum is pressed out of a sheet of metal of uniform thickness.

The invention will be well understood by referring to the accompanying drawing wherein, by way of example, the wheel represented is a wheel with spokes of steel wires.

In the drawing, 1 represents the removable external hub, 2 the permanent internal hub, 3 the wheel rim, 4 the set of spokes connecting the removable hub with the wheel rim, 5 the central fixing nut securing the external removable hub 1 to the internal permanent hub 2.

6 represents the system of teeth providing for the connection between the hubs 1 and 2 in their rotary movement, 7 represents the part of the hub 1 forming a brake drum, 1ª represents the part of the hub 1 which forms a sleeve and within which is preferably cut, the toothed portion of the device connecting together the two hubs.

A spare wheel, mounted on a suitable support carried by the vehicle, may be mounted indifferently upon any one of the ends either of the front axle or of the rear axle, should it be necessary to replace one of the wheels in use on the vehicle.

Having now described my invention, what I claim as new and desire to secure by Letters Patent is:

In a removable wheel for motor cars mounted on an internal permanent hub secured to the axle of the vehicle, a hub for said wheel pressed from a sheet of metal in a single piece and comprising all together a brake drum, a sleeve of great length adapted to center the wheel on the permanent hub and provided with means for driving said wheel by said permanent hub, a flange connecting said sleeve to said brake drum and two conical bearing surfaces at both ends of said sleeve adapted to be held against two corresponding bearing surfaces provided respectively on said permanent hub and on a terminal nut screwed on said permanent hub.

In testimony whereof I have signed my name to this specification.

LOUIS ROUANET.